United States Patent
Johnson

(10) Patent No.: US 11,292,382 B2
(45) Date of Patent: Apr. 5, 2022

(54) SECUREMENT APPARATUS AND USE THEREOF

(71) Applicant: Corey B. Johnson, Hyrum, UT (US)

(72) Inventor: Corey B. Johnson, Hyrum, UT (US)

( * ) Notice: Subject to any disclaimer, the term of this patent is extended or adjusted under 35 U.S.C. 154(b) by 203 days.

(21) Appl. No.: 16/434,174

(22) Filed: Jun. 7, 2019

(65) Prior Publication Data

US 2019/0283652 A1  Sep. 19, 2019

Related U.S. Application Data

(60) Provisional application No. 62/684,868, filed on Jun. 14, 2018.

(51) Int. Cl.
*B60P 3/075* (2006.01)
*B60P 7/08* (2006.01)

(52) U.S. Cl.
CPC ............ *B60P 7/0807* (2013.01); *B60P 3/075* (2013.01); *B60P 7/083* (2013.01); *B60P 7/0815* (2013.01); *B60P 7/0823* (2013.01)

(58) Field of Classification Search
CPC ..... B60P 7/0807; B60P 7/0815; B60P 7/0823; B60P 7/083; B60P 3/075
USPC .......................................................... 410/21
See application file for complete search history.

(56) References Cited

U.S. PATENT DOCUMENTS

| | | | | |
|---|---|---|---|---|
| 4,611,961 A * | 9/1986 | Van Iperen | ............. | B60P 3/075 248/499 |
| 4,632,629 A * | 12/1986 | Kooima | ................... | B60P 3/125 280/402 |
| 4,772,165 A * | 9/1988 | Bartkus | ..................... | B60P 7/15 211/7 |
| 4,850,767 A * | 7/1989 | Andre | .................... | B60P 3/075 410/9 |
| 4,854,790 A * | 8/1989 | Andre | .................... | B60P 3/075 410/30 |
| 5,560,576 A * | 10/1996 | Cargill | ...................... | B60P 7/15 224/331 |
| 5,775,870 A * | 7/1998 | Hogan | ..................... | B66F 7/22 254/94 |
| 5,938,226 A * | 8/1999 | Transchel | ................. | B60R 9/06 280/402 |
| 5,941,665 A * | 8/1999 | Dahlin | ................... | B60P 3/075 410/20 |
| 5,971,685 A | 10/1999 | Owens | ........................ | 410/151 |
| 6,651,996 B1 * | 11/2003 | Allemang | ............... | B60D 1/52 280/402 |
| 6,675,980 B2 | 1/2004 | Ehrgott | ........................ | 211/189 |
| 6,729,485 B2 | 5/2004 | Ehrgott | ........................ | 211/189 |
| 7,025,545 B1 * | 4/2006 | Robison | .................. | B60P 3/075 410/10 |
| 8,028,845 B2 | 10/2011 | Himes | ........................... | 211/103 |
| 8,439,612 B2 | 5/2013 | Chamoun | .................... | 410/121 |

(Continued)

OTHER PUBLICATIONS

Over-The-Tire Adjustable Strap—Google—May 30, 2019.

*Primary Examiner* — Hilary L Gutman
(74) *Attorney, Agent, or Firm* — Michael R. Schramm

(57) ABSTRACT

The present invention is a securement apparatus and method of use. The securement apparatus comprises a spring E-fitting device connected to a strap device. The securement apparatus is preferably releasably attached to a section of E-track that is preferably fastened to a head wall of a pickup truck bed or a trailer and is useful in quickly and easily securing objects thereto.

17 Claims, 8 Drawing Sheets

(56) References Cited

U.S. PATENT DOCUMENTS

| | | | |
|---|---|---|---|
| 8,690,503 B2 | 4/2014 | Chamoun | 410/121 |
| 9,346,392 B1 | 5/2016 | Neal et al. | B60P 7/0815 |
| 2002/0117464 A1 | 8/2002 | Ehrgott | 211/189 |
| 2002/0117465 A1 | 8/2002 | Ehrgott | 211/189 |
| 2005/0238455 A1* | 10/2005 | Toteff | B60P 3/122 410/104 |
| 2008/0185489 A1 | 8/2008 | Ehrgott | 248/224.7 |
| 2009/0120888 A1 | 5/2009 | Himes | 211/103 |
| 2012/0257943 A1 | 10/2012 | Chamoun | 410/122 |
| 2014/0360957 A1 | 12/2014 | Himes | B60P 7/0815 |
| 2016/0167717 A1 | 6/2016 | Marchlewski et al. | B62D 33/0207 |
| 2016/0207441 A1 | 7/2016 | Khan | B60P 7/15 |
| 2018/0264985 A1 | 9/2018 | Johnson | B60P 3/077 |
| 2018/0264988 A1 | 9/2018 | Johnson | B60P 7/0815 |
| 2018/0334073 A1 | 11/2018 | Johnson | B60P 3/077 |

* cited by examiner

SECUREMENT APPARATUS AND USE THEREOF

CROSS REFERENCE TO RELATED APPLICATIONS

This nonprovisional utility patent application claims the benefit under 35 USC § 119(e) of U.S. provisional application No. 62/684,868 filed Jun. 14, 2018 which is incorporated herein in its entirety by this reference.

FIELD OF THE INVENTION

The present invention relates to cargo securement apparatuses, and in particular, to securement apparatuses having cargo straps for use in quickly and conveniently removably securing objects in truck beds and trailers, and methods of use thereof.

BACKGROUND OF THE INVENTION

Various means are known in the art for releasably securing objects in truck beds and trailers and the like. However, such means have typically been awkward and time consuming and cumbersome to secure and to release. Examples of various mounting systems are disclosed in the following list of US patents and applications, all of which are expressly incorporated herein by reference: U.S. Pat. No. 5,971,685 to Owens, U.S. Pat. No. 6,675,980 to Ehrgott, U.S. Pat. No. 6,729,485 to Ehrgott, U.S. Pat. No. 8,028,845 to Himes, U.S. Pat. No. 8,439,612 to Chamoun, U.S. Pat. No. 8,690,503 to Chamoun, U.S. Pat. No. 9,346,392 to Neal, 20020117464 to Ehrgott, 20020117465 to Ehrgott, 20080185489 to Ehrgott, 20090120888 to Himes, 20120257943 to Chamoun, 20140360957 to Himes, 20160167717 to Marchlewski, 20160207441 to Khan, 20180264985 to Johnson, 20180264988 to Johnson, and 20180334073 to Johnson. Further, it is known to provide E-Track (see Appx A) and various spring E-fittings such as a spring E-fitting having a swivel ring (E-Track ring) (see Appx B). E-Track and various E-fittings are commercially available from a variety of sources such as Harbor Freight Tools.

SUMMARY OF THE INVENTION

The present invention is a securement apparatus and method of use. The securement apparatus comprises spring E-fitting device connected to a strap device. The securement apparatus is preferably releasably attached to a section of E-track that is preferably fastened to a head wall of a pickup truck bed or a trailer and is useful in quickly and easily securing objects thereto.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
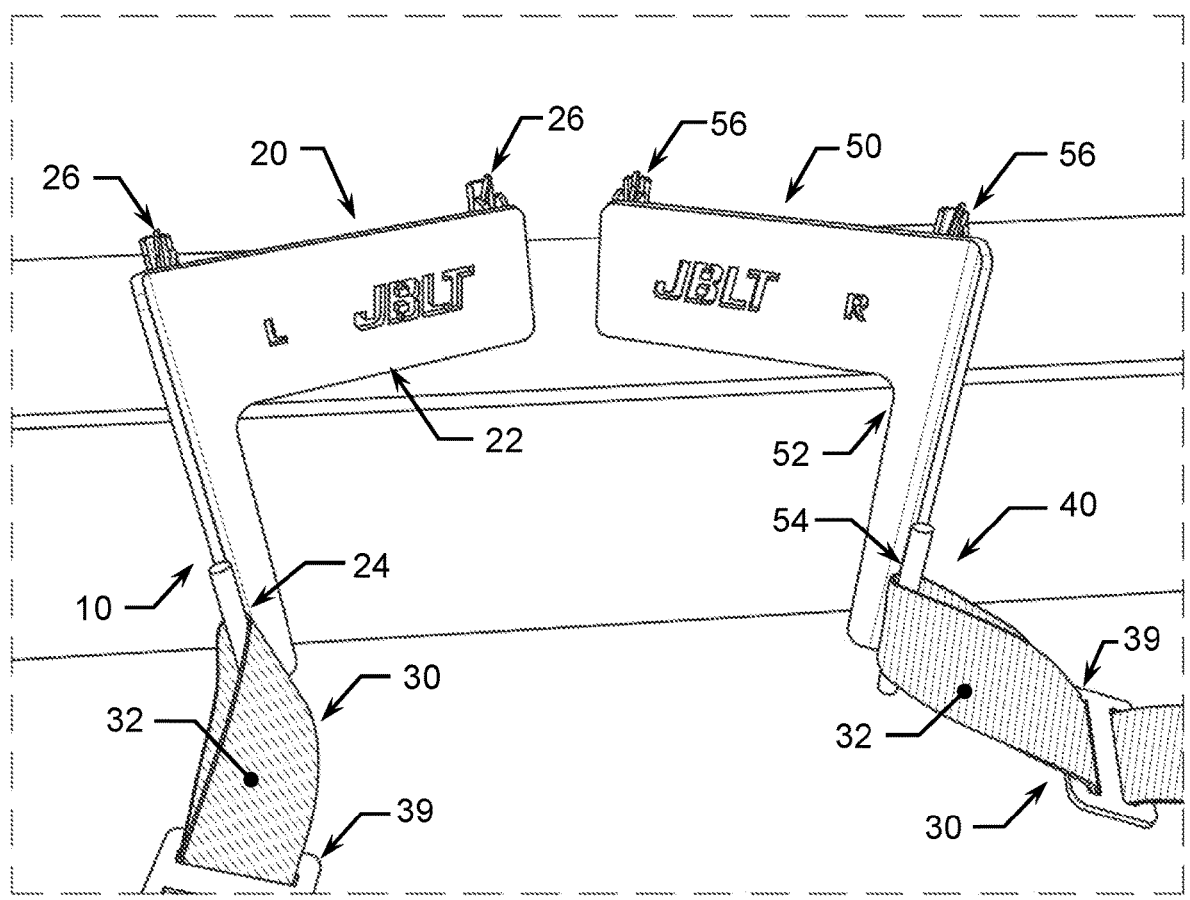
FIG. 1 is a first trimetric view of a first embodiment of the securement apparatus not attached to a structure.
Figure 2:
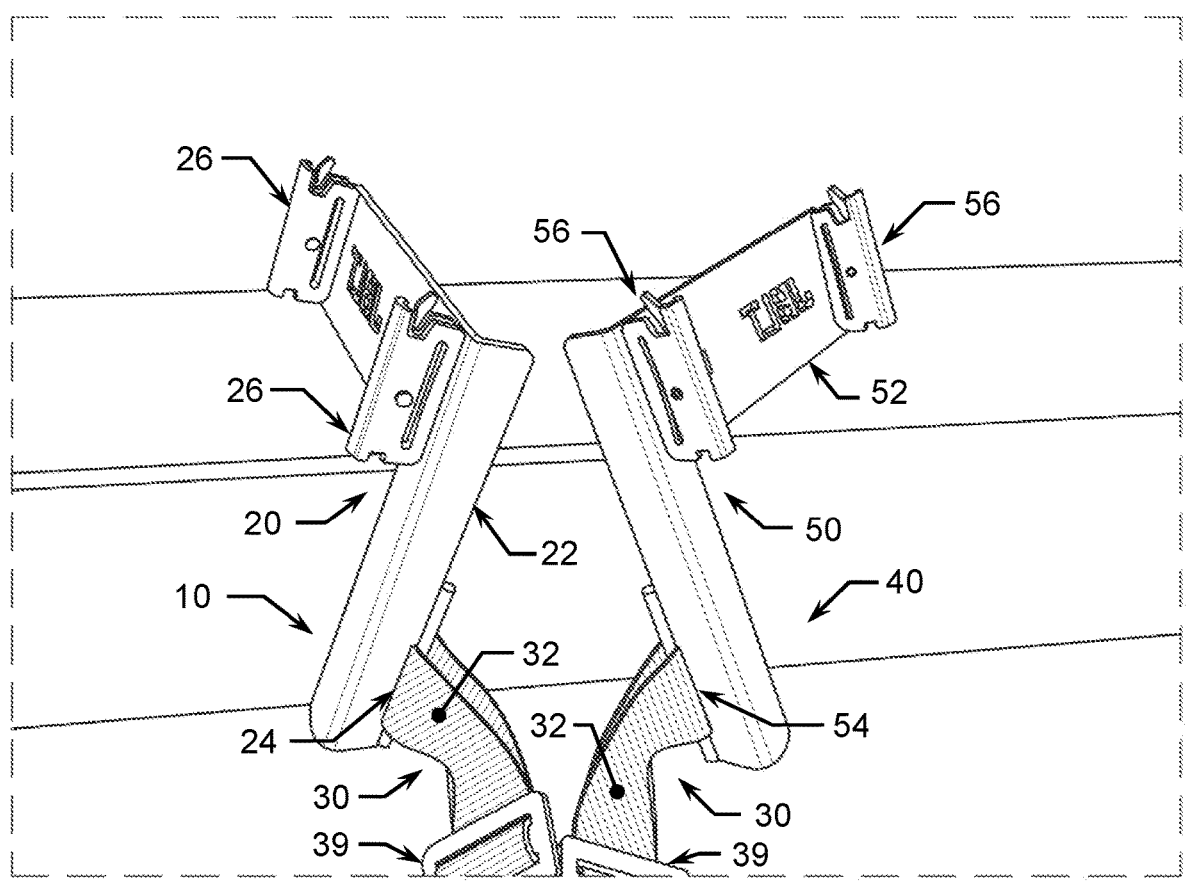
FIG. 2 is a second trimetric view of the first embodiment of the securement apparatus not attached to a structure.
Figure 3:
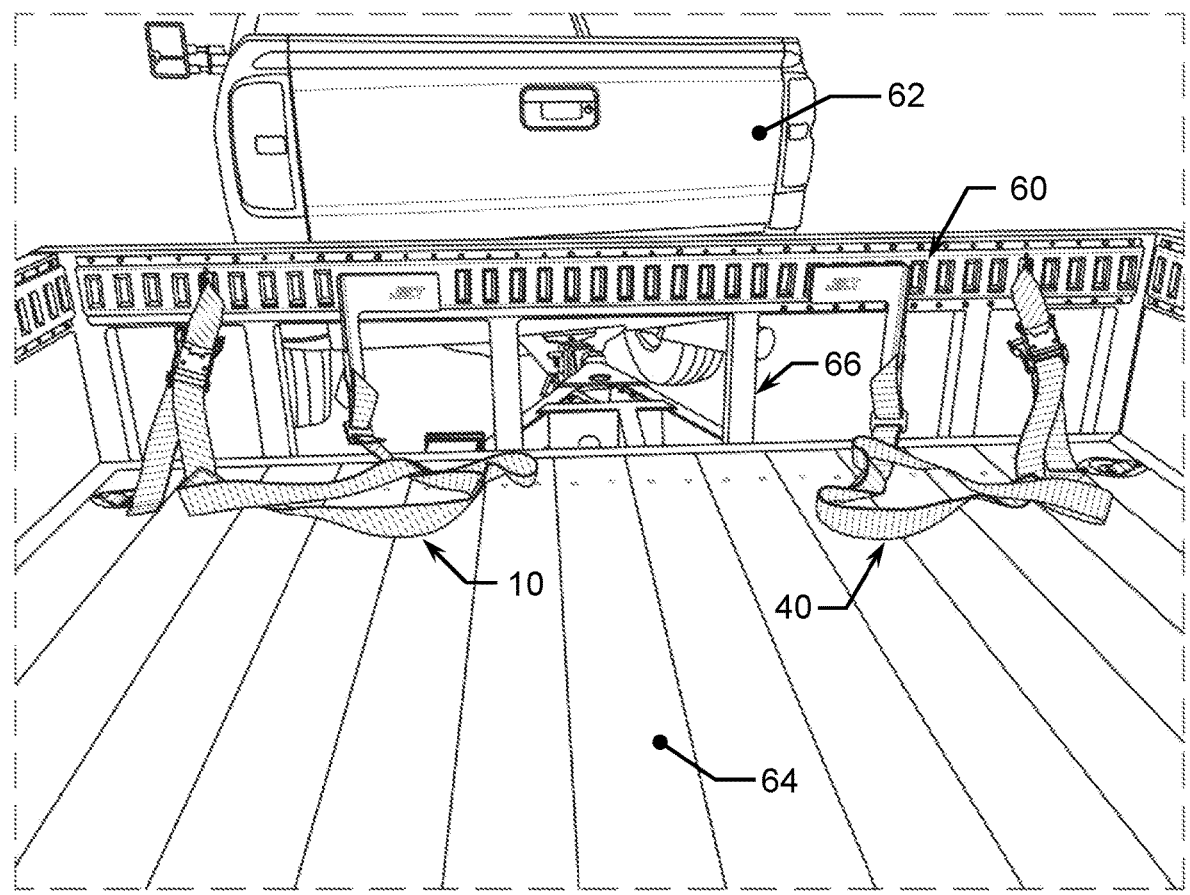
FIG. 3 is a front view of the first embodiment of the securement apparatus attached to a section of E-track that is mounted to a trailer head wall.
Figure 4:
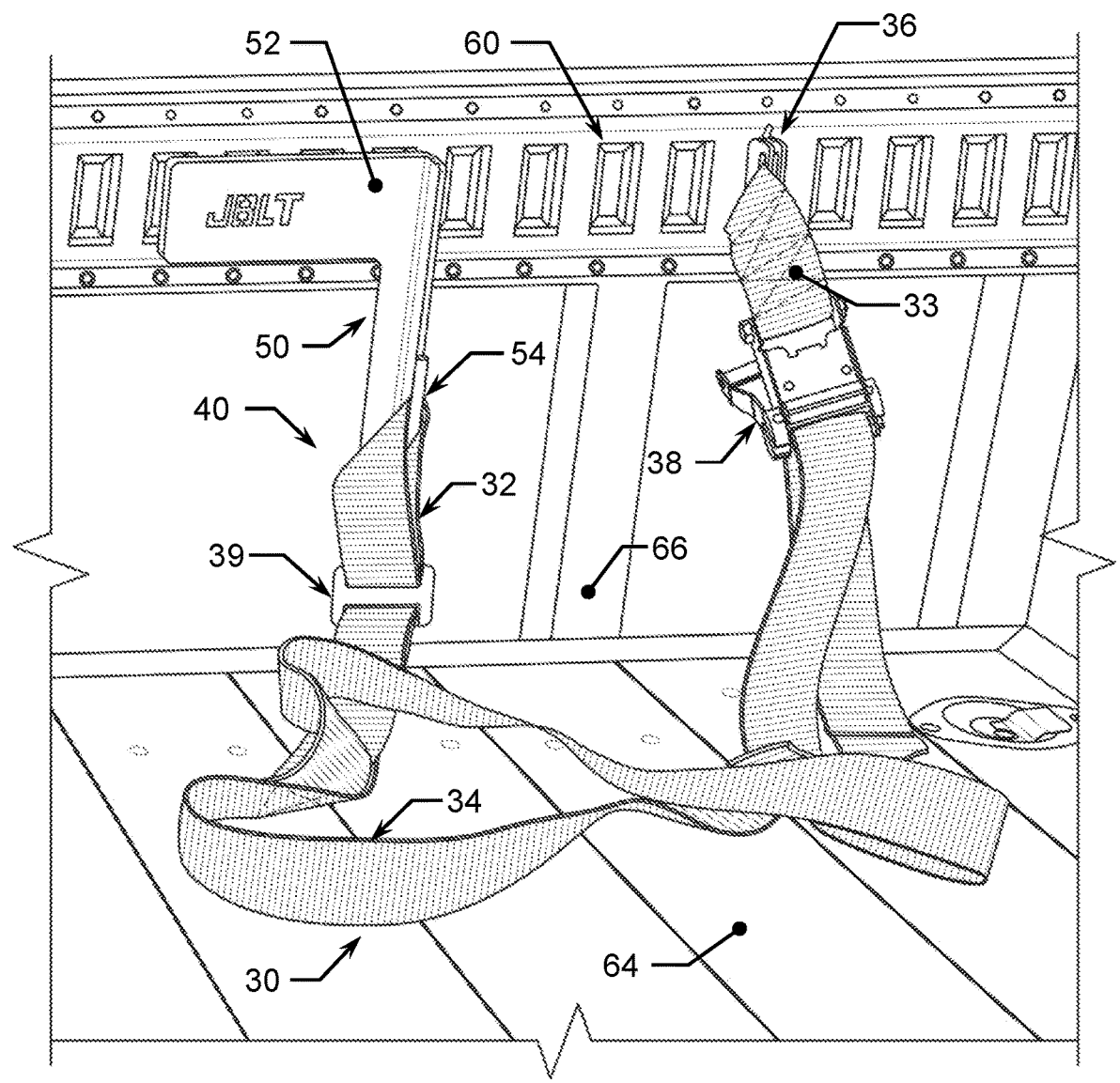
FIG. 4 is an enlarged view of the RH securement apparatus of the first embodiment shown in FIG. 3.
Figure 5:
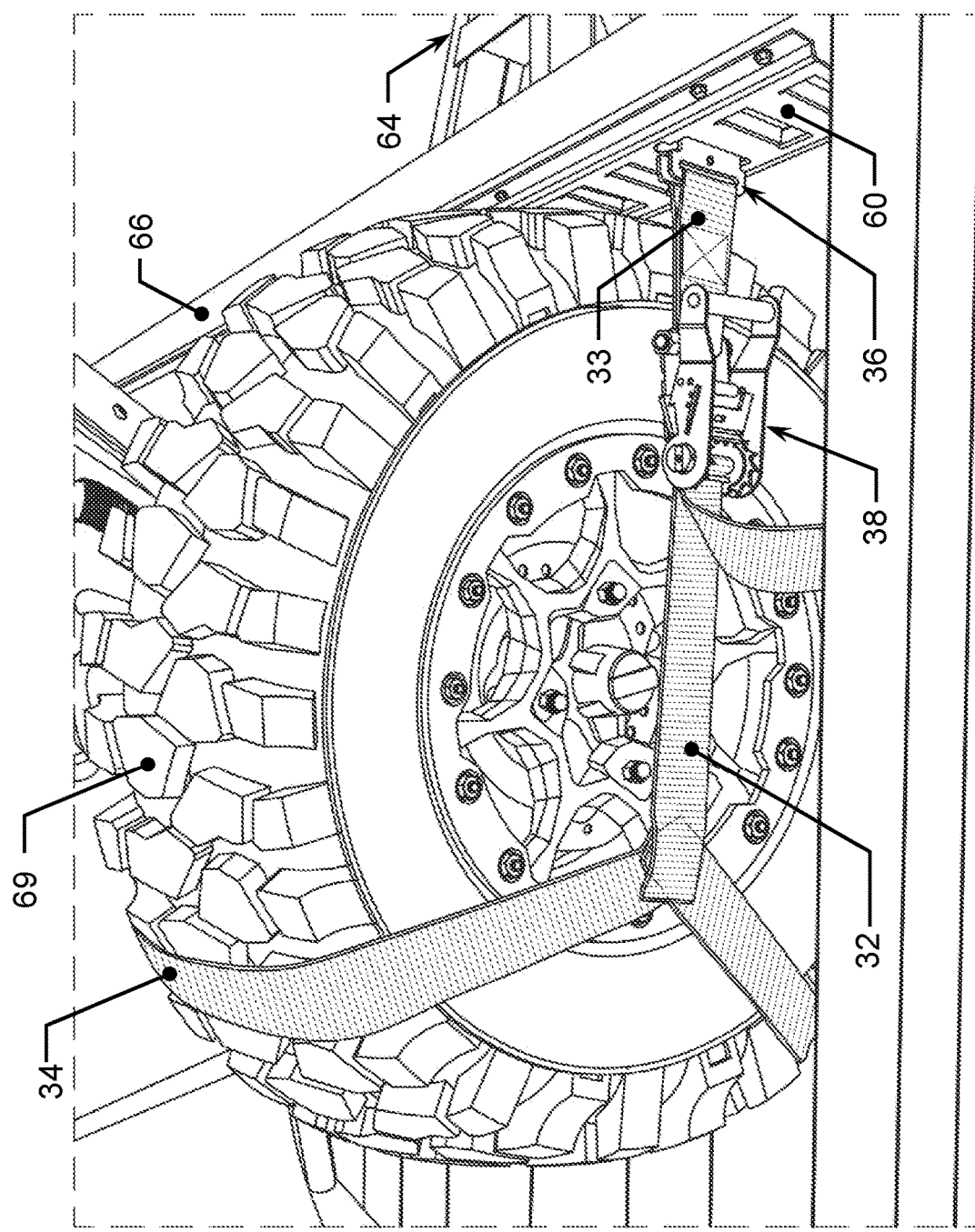
FIG. 5 is a right side view of the RH securement apparatus of the first embodiment attached to a section of E-track that is mounted to a trailer head wall and having an ATV wheel secured therein.
Figure 6:
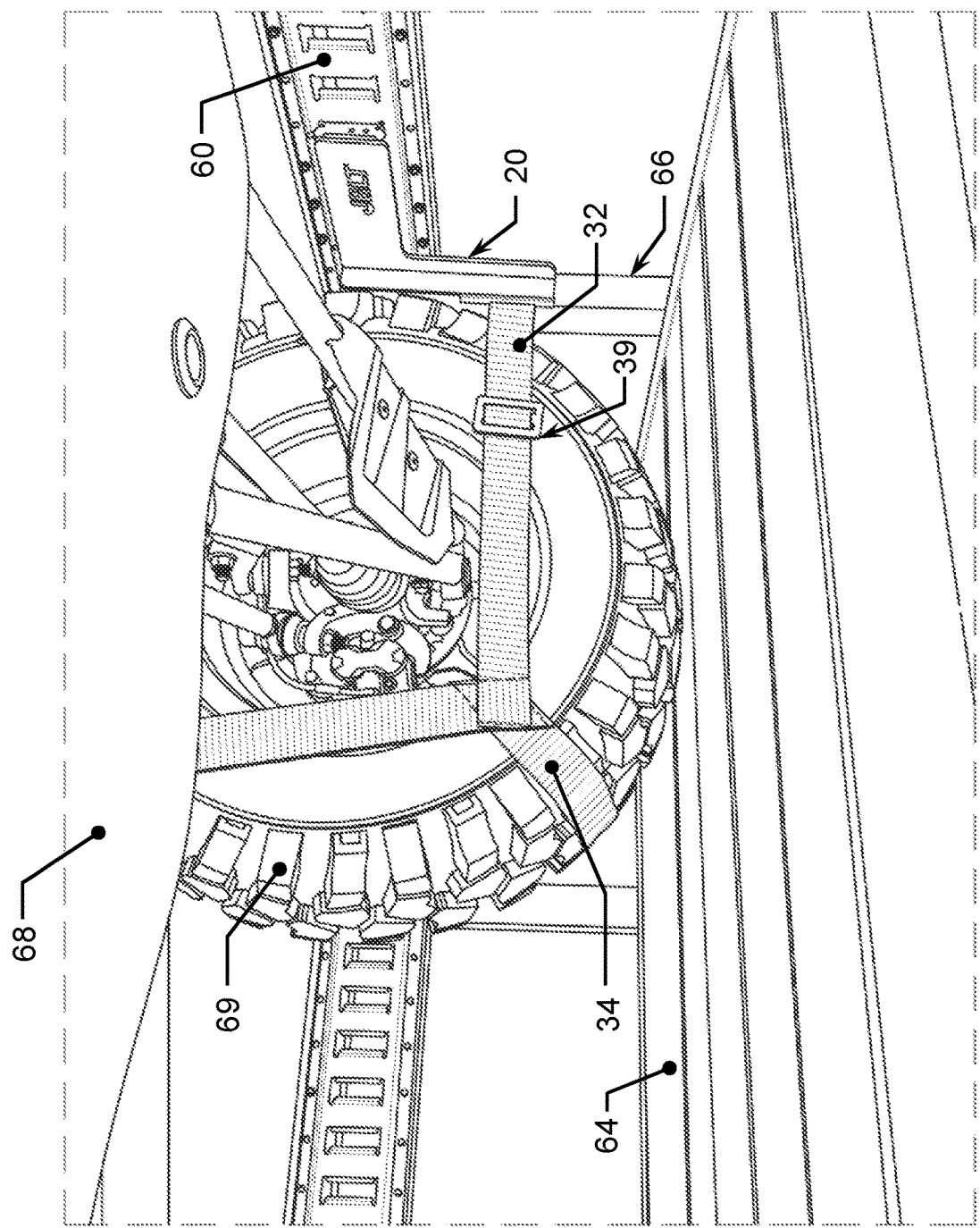
FIG. 6 is a right side view of the LH securement apparatus of the first embodiment attached to a section of E-track that is mounted to a trailer head wall and having an ATV wheel secured therein.
Figure 7:
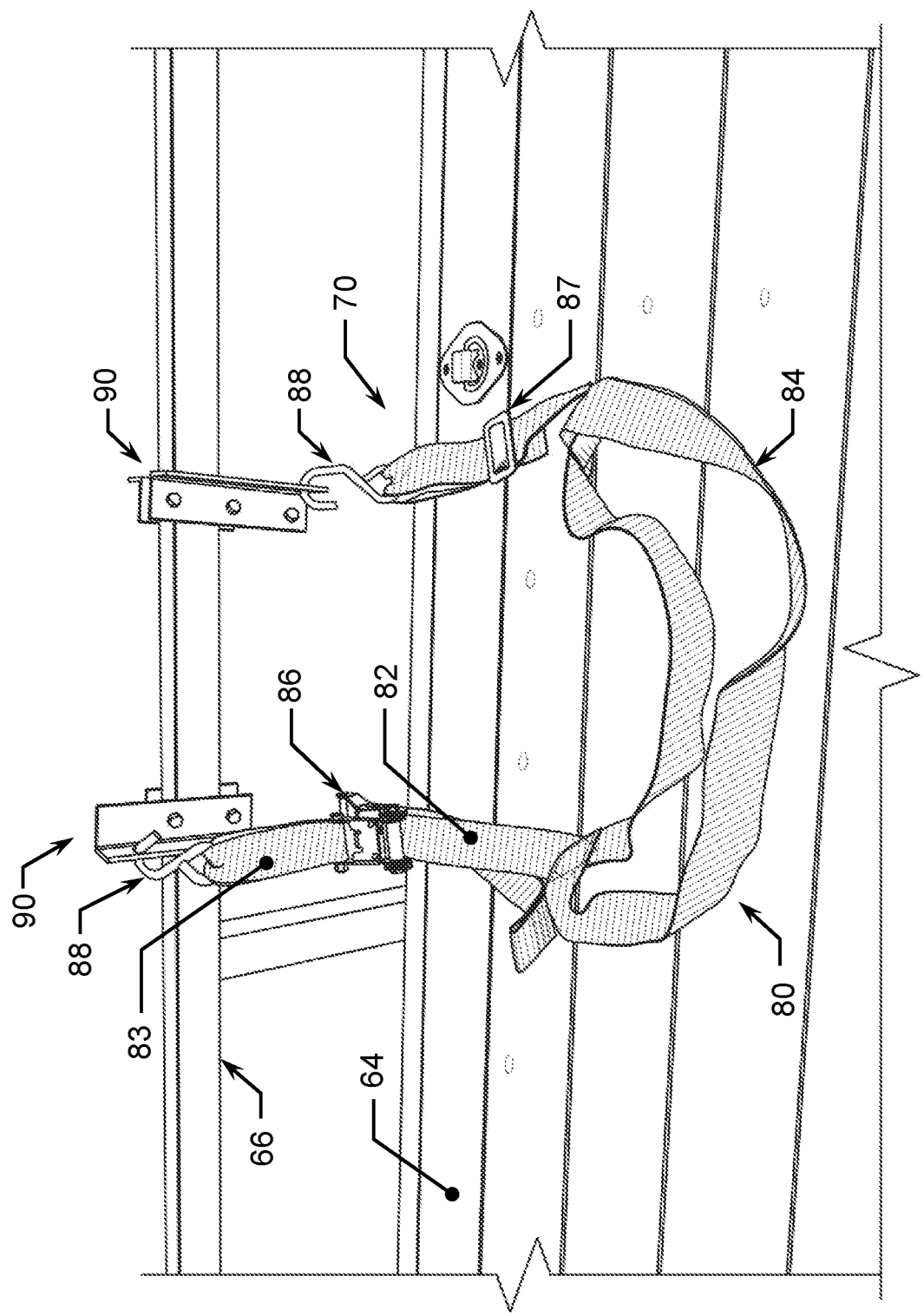
FIG. 7 is a first trimetric view of a second embodiment of the securement apparatus attached to brackets that are mounted to a trailer head wall.
Figure 8:
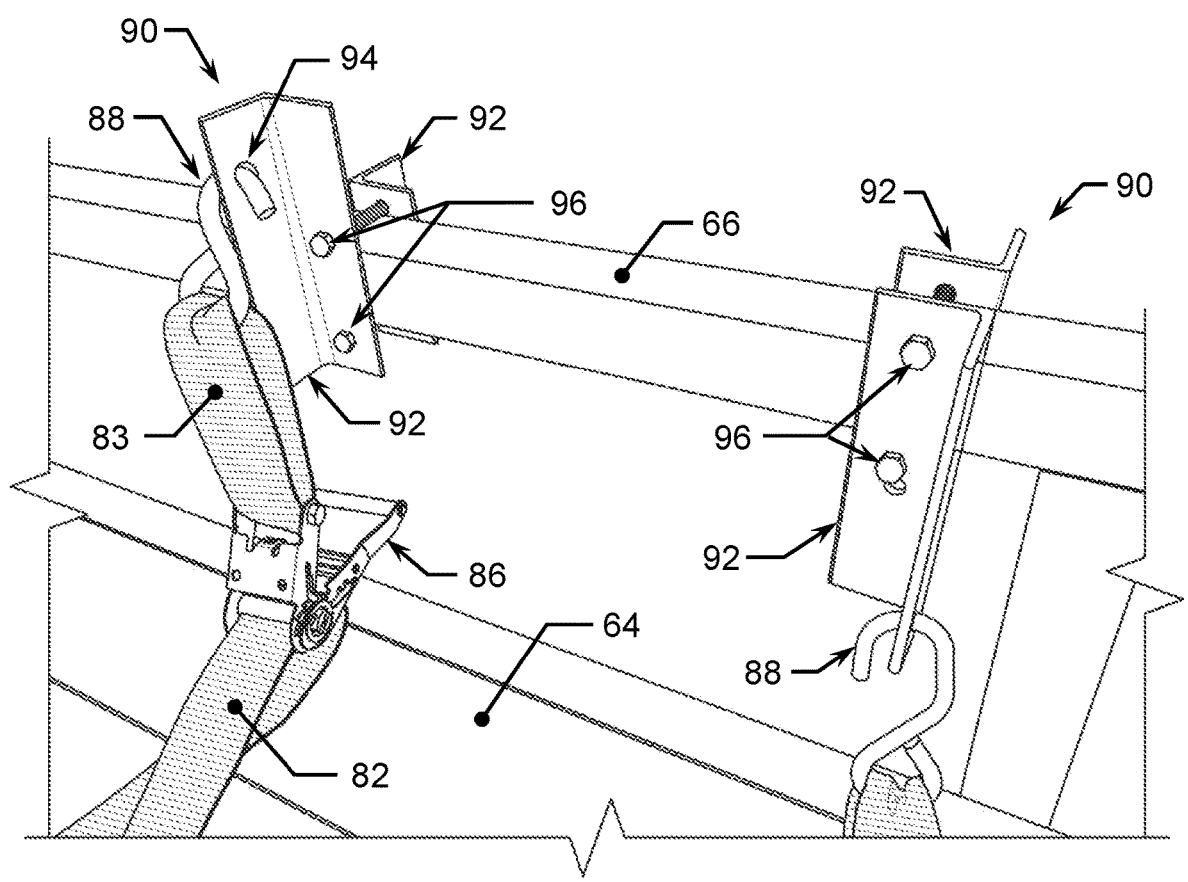
FIG. 8 is a second trimetric view of the second embodiment of the securement apparatus attached to brackets that are mounted to a trailer head wall.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature | # | Feature |
|---|---------|---|---------|
| 10 | LH securement apparatus | 20 | LH spring E-fitting device |
| 22 | Angle plate | 24 | Strap slot |
| 26 | Spring E-fitting | 30 | Strap device |
| 32 | First strap member | 33 | Second strap member |
| 34 | Strap cradle | 36 | Spring E-fitting |
| 38 | Ratchet | 39 | Adjustment clip |
| 40 | RH securement apparatus | 50 | RH spring E-fitting device |
| 52 | Angle plate | 54 | Strap slot |
| 56 | Spring E-fitting | 62 | Truck |
| 60 | E-track | 66 | Trailer head wall |
| 64 | Trailer | 69 | ATV wheel |
| 68 | ATV | 80 | Strap device |
| 70 | Securement apparatus | 83 | Second strap member |

-continued

FEATURE TABLE

| # | Feature | # | Feature |
|---|---------|---|---------|
| 82 | First strap member | 86 | Ratchet |
| 84 | Strap cradle | 88 | Hook |
| 87 | Adjustment clip | 92 | Angled beam |
| 90 | Mount bracket | 96 | Bolt |
| 94 | Hook reception hole | | |

Referring now to the drawings, a first embodiment of the invention is left hand (LH) securement apparatus 10 comprising LH spring E-fitting device 20 connected to strap device 30. Spring E-fitting device 20 further defines a preferably metal angle plate 22 having a pair of spring E-fittings 26 welded thereto and strap slot 24 formed therein. Strap device 30 further defines first strap member 32, second strap member 33, adjustment clip 39, ratchet 38, and spring E-fitting 36. First strap member 32 is connected on a first end to LH spring E-fitting device 20 by being looped through strap slot 24 and is length adjustable via adjustment clip 39, and is connected on a second end to ratchet 38 and is length adjustable via ratchet 38, and has strap cradle 34 connected therebetween. Second strap member 33 is connected on a first end to ratchet 38 and is connected on a second end to LH spring E-fitting device 20. The securement apparatus is preferably provided as a left hand and right hand pair of securement apparatuses. Thus also disclosed is right hand (RH) securement apparatus 40 comprising RH spring E-fitting device 50 connected to strap device 30. Spring E-fitting device 50 further defines a preferably metal angle plate 52 having a pair of spring E-fittings 56 welded thereto and strap slot 54 formed therein. First strap member 32 is connected on a first end to RH spring E-fitting device 50 by being looped through strap slot 54 and is length adjustable via adjustment clip 39, and is connected on a second end to ratchet 38 and is length adjustable via ratchet 38, and has strap cradle 34 connected therebetween. Second strap member 33 is connected on a first end to ratchet 38 and is connected on a second end to spring E-fitting device 50.

The securement apparatus is preferably used by providing both a LH securement apparatus and a RH securement apparatus for securing things such as an ATV, but the securement apparatus may be used singularly such as in the securement of a motorcycle. In exemplary use, LH securement apparatus 10 is removably secured to a section of E-track 60 that is preferably fastened to a trailer 64 or a truck 62 bed by snappingly engaging spring E-fitting devices 26 of LH spring E-fitting device 20 and spring E-fitting device 36 of LH strap device 30 into slots of a section of E-track 60 and RH securement apparatus 40 is removably secured to the section of E-track 60 by snappingly engaging spring E-fitting devices 56 of the RH spring E-fitting 50 and spring E-fitting device 36 of RH strap device 30 into slots of a section of E-track 60. A first wheel 69 of an ATV 68 (or like vehicle) is positioned in the strap cradle 34 of LH securement apparatus 10 and first strap member 32 is snuggingly adjusted via adjustment clip 39 of LH securement apparatus 10. Ratchet 38 of LH securement apparatus 10 is then cranked or ratcheted such that the first wheel 69 of ATV 68 is tightly secured against E-track 60. A second wheel 69 of ATV 68 is positioned in strap cradle 34 of RH securement apparatus 40 and first strap member 32 is snuggingly adjusted via adjustment clip 39 of RH securement apparatus 40. Ratchet 38 of RH securement apparatus 40 is then cranked or ratcheted such that second wheel 69 of ATV 68 is tightly secured against E-track 60.

Referring now to the drawings, a second embodiment of the invention is securement apparatus 70 comprising strap device 80 and a plurality of mount brackets 90. Strap device 80 further defines first strap member 82, second strap member 83, ratchet 86, adjustment clip 87, and hooks 88. First strap member 82 is connected on a first end to a first instance of hook 88 and is length adjustable via adjustment clip 87, and is connected on a second end to ratchet 86 and is length adjustable via ratchet 86, and has strap cradle 84 connected therebetween. Second strap member 83 is connected on a first end to ratchet 86 and is connected on a second end to a second instance of hook 88. Mount bracket 90 further defines a mount bracket having a pair of angled beams 92 having hook reception holes formed therein and having a plurality of bolts 96.

Securement apparatus 70 is preferably used by providing a pair of securement apparatuses 70 for securing things such as an ATV, but securement apparatus 70 may be used singularly such as in the securement of a motorcycle. In exemplary use, pairs of mount brackets 90 of a pair of securement apparatuses 70 are mounted to a structure such as a trailer head wall 66 of a trailer 64 by positioning each angled beam 92 of a pair of angled beams 92 of each mount bracket 90 on opposite sides of trailer head wall 66 of a complementary instance of an angled beam 92, and fastening angled beams 92 to trailer head wall 66 by means of bolts 96. A first wheel 69 of an ATV 68 (or like vehicle) is positioned in the strap cradle 84 of a first instance of a securement apparatus 70 and first strap member 82 is snuggingly adjusted via adjustment clip 87 of a first instance of securement apparatus 70. Ratchet 86 of first instance of securement apparatus 70 is then cranked or ratcheted such that the first wheel 69 of ATV 68 is tightly secured against trailer head wall 66. A second wheel 69 of ATV 68 is positioned in the strap cradle 82 of a second instance of a securement apparatus 70 and first strap member 82 is snuggingly adjusted via adjustment clip 87 of second instance of securement apparatus 70. Ratchet 86 of second instance of securement apparatus 70 is then cranked or ratcheted such that the second wheel 69 of ATV 68 is tightly secured against trailer head wall 66.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A securement apparatus comprising a strap device having a plurality of connected strap members, a spring E-fitting device connected to a first end of said strap device, and a spring E-fitting connected to a second end of said strap device, wherein said apparatus is adapted such that when a securement tension load is placed on at least one of said connected strap members, said securement tension load is reacted by at least one of the spring E-fitting and the spring E-fitting device;

wherein said spring E-fitting device further defines an angular metal plate having a plurality of spring E-fittings welded to a first end of said angular metal plate and a strap reception slot formed in a second end of said angular metal plate.

2. The securement apparatus of claim 1, wherein said strap device includes at least one strap member threaded through said strap reception slot.

3. The securement apparatus of claim 1, wherein said strap device further defines a first strap member and a second strap member, and wherein said first strap member includes an adjustment clip connected to a first end thereof, a ratchet connected to a second end thereof, and a strap cradle connected therebetween, and wherein said second strap member is connected to said ratchet on a first end thereof.

4. The securement apparatus of claim 1, wherein said securement apparatus is connected to a section of E-track.

5. The securement apparatus of claim 1, wherein said spring E-fittings are removably engaged into a section of E-track.

6. The securement apparatus of claim 1, wherein said securement apparatus is positioned in restraining contact to a wheel.

7. The securement apparatus of claim 6, wherein said wheel defines an ATV wheel connected to an ATV.

8. The securement apparatus of claim 4, wherein said E-track is secured to at a wall of at least one of a trailer and a pickup truck bed.

9. A method of securing an object comprising providing a securement apparatus comprising a strap device having a plurality of connected strap members, a spring E-fitting device connected to a first end of said strap device, and a spring E-fitting connected to a second end of said strap device, removably engaging said securement apparatus to a section of E-track, positioning an object within said strap device, and tightening said securement apparatus against said object such that said object is secured against said section of E-track by said securement apparatus, wherein said tightening causes a securement tension load to be placed on at least one of said connected strap members, and wherein said securement tension load is reacted by at least one of the spring E-fitting and the spring E-fitting device;

wherein said spring E-fitting device further defines an angular metal plate having a plurality of spring E-fittings welded to a first end of said angular metal plate and a strap reception slot formed in a second end of said angular metal plate.

10. The method of claim 9, wherein said strap device includes at least one strap member threaded through said strap reception slot.

11. The method of claim 9, wherein said strap device further defines a first strap member and a second strap member, and wherein said first strap member includes an adjustment clip connected to a first end thereof, a ratchet connected to a second end thereof, and a strap cradle connected therebetween, and wherein said second strap member is connected to said ratchet on a first end thereof.

12. The method of claim 11, wherein said tightening further defines ratcheting said ratchet.

13. The method of claim 9, wherein said securement apparatus is connected to a section of E-track.

14. The securement apparatus of claim 9, wherein said spring E-fittings are removably engaged into a section of E-track.

15. The method of claim 9, wherein said securement apparatus contains a wheel removably secured therein.

16. The method of claim 15, wherein said wheel defines an ATV wheel connected to an ATV.

17. The method of claim 13, wherein said E-track is secured to at a wall of at least one of a trailer and a pickup truck bed.

* * * * *